United States Patent
Da Palma et al.

(10) Patent No.: US 7,826,600 B2
(45) Date of Patent: Nov. 2, 2010

(54) METHOD AND PROCEDURE FOR COMPILING AND CACHING VOICEXML DOCUMENTS IN A VOICE XML INTERPRETER

(75) Inventors: William V. Da Palma, Coconut Creek, FL (US); Brett J. Gavagni, Coconut Creek, FL (US); Matthew W. Hartley, Boynton Beach, FL (US); Brien H. Muschett, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1320 days.

(21) Appl. No.: 10/744,300

(22) Filed: Dec. 22, 2003

(65) Prior Publication Data

US 2005/0135572 A1  Jun. 23, 2005

(51) Int. Cl.
  H04M 1/64 (2006.01)
  G06F 15/177 (2006.01)
(52) U.S. Cl. ..................................... 379/88.01; 715/234
(58) Field of Classification Search ............... 379/88.01
  See application file for complete search history.

(56) References Cited

U.S. PATENT DOCUMENTS

| | | | | |
|---|---|---|---|---|
| 6,128,623 A * | 10/2000 | Mattis et al. | ................ | 711/118 |
| 6,249,844 B1 * | 6/2001 | Schloss et al. | .............. | 711/122 |
| 6,507,817 B1 | 1/2003 | Wolfe et al. | | |
| 6,578,000 B1 * | 6/2003 | Dodrill et al. | ................ | 704/270 |
| 6,901,403 B1 * | 5/2005 | Bata et al. | ..................... | 707/101 |
| 7,062,709 B2 * | 6/2006 | Cheung | ....................... | 715/234 |
| 7,240,067 B2 * | 7/2007 | Timmons | .................... | 707/101 |
| 7,711,095 B2 * | 5/2010 | Erhart et al. | ............. | 379/88.13 |
| 2002/0133627 A1 * | 9/2002 | Maes et al. | ................. | 709/246 |
| 2004/0049737 A1 * | 3/2004 | Hunt et al. | .................. | 715/513 |

* cited by examiner

Primary Examiner—Joseph T Phan
(74) Attorney, Agent, or Firm—Jeanine S. Ray-Yarletts, Esq.; Steven M. Greenberg, Esq.; Carey Rodriguez Greenberg & Paul LLP

(57) ABSTRACT

A method and system of compiling and caching voice application documents in order to provide more efficient retrieval of resources in a web-programming model such as in the VoiceXML domain. The method and system of the present invention requires that a voice application resource such as a VoiceXML document first be transformed into a representative object model before it is stored in the system's cache memory, and that this model becomes the voice application resource that is ultimately executed by the VoiceXML interpreter. The representative object model contains all of the data of the original source document but in a compressed and optimized format therefore occupying a smaller footprint in memory. The representative object model also contains the code necessary to execute the data. Further, the compressed representative object model does not need to be compiled again before execution. Because the object model stored in cache contains a compiled representation of the original resource and not the original resource itself, it can be executed as a binary object, thus leading to greater efficiency during execution and the reduction of cost and hardware utilization.

9 Claims, 2 Drawing Sheets

METHOD AND PROCEDURE FOR COMPILING AND CACHING VOICEXML DOCUMENTS IN A VOICE XML INTERPRETER

BACKGROUND OF THE INVENTION

1. Statement of the Technical Field

The present invention relates to the field of interactive voice response applications and more particularly to a method and system of compiling and caching documents in an interactive voice response system that creates an object model representation of a document fetched from a server and stores that object model in cache in order to obtain a more efficient web-based programming model.

2. Description of the Related Art

In a typical software application using a high level programming language such as C or C++, a text editor is first used to write the code. A compiler is then used to parse the source code and to build the object models and the final executable code. The compiler therefore provides executable code that does not require re-interpreting. However, in a web-based environment, much of the text is human readable text that needs to be interpreted and the interpretation of text in a web application can be costly.

The location of a resource in a file system is indicated by its Universal Resource Indicator (URI). In a web environment, a user can access a document on a remote web application server by sending a request for the document, referencing the document's URI. The request includes the location of that document (a URI) in the form of a Universal Resource Location (URL). When the user later attempts to revisit the web server in order to re-access the document, there is no need to again reference the URI of the requested document across the web since the requested resource has already been loaded onto the user's web browser and stored in cache on the user's computer. This process allows document retrieval time to be minimized.

In a typical Interactive Voice Response (IVR) application such as a VoiceXML system, the system requests content from a remote sever over a communication network such as the Internet. In response, the server creates VoiceXML documents and returns the documents to a VoiceXML platform where they are stored in the system's cache memory. However, because what is typically stored in cache is the original source document which must again be interpreted or re-parsed before it is executed, the result is a time-consuming and costly procedure. Therefore, although the process of storing the requested resource in the system's cache reduces document-retrieval time, the document parsing/validation time remains unchanged because the resource stored in cache must still be parsed and validated before it can be executed.

IVR systems require fast interpretation of voice commands and quick response turnaround. After receiving a voice or touchtone command, a request must be sent to a remote server for data, and documents must be created and returned to the system in order for a voice response to be provided, either via text-to-speech conversion or via a voice recognition engine. Further adding to the system response time is the process of reparsing resources that have been retrieved from the web server and that have been stored in the system's cache memory.

Therefore, in order to provide a more efficient document retrieval system, particularly when dealing with the retrieval of documents in a VoiceXML application, what is needed is a method and system that reduces the time and cost associated with the retrieval of documents stored in a system cache by eliminating the need to reparse and revalidate the stored documents prior to their execution.

SUMMARY OF THE INVENTION

The present invention addresses the deficiencies of the art in respect to compiling and caching voice application documents and provides a novel and non-obvious method and system for translating voice application documents into representative object models that do not require reparsing before they are executed.

The present invention provides a method and system of storing voice application resources such as VoiceXML documents received from a web server in the system's cache memory. Instead of storing the actual resource, the present invention creates an object model that represents the requested document and stores this object model in memory. The object model is a compiled version of the actual document resource and therefore does not need to be reparsed before it is executed. The object model is comprised of data representing the VoiceXML document as well as code that is necessary to execute the data.

Methods consistent with the present invention provide a method of caching documents in a voice recognition system. The method includes receiving a requested voice application resource from a server and creating a representative object model from the voice application resource. The representative object model is stored in memory for execution by an interpreter.

Systems consistent with the present invention include a system for caching documents in a voice recognition system. The system includes a voice application server having an interpreter for executing a cached document. The system also includes one or more memory devices adapted to store the cached document, and a central processing unit. The central processing unit is configured to convert a requested document into a representative object model where the representative object model is stored in the one or more memory devices.

In accordance with still another aspect, the present invention provides a computer-readable storage medium storing a computer program which when executed performs a document caching method. The method includes receiving a requested voice application resource from a server, creating a representative object model from the voice application resource, and storing the representative object model in memory for execution.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method and system of compiling and caching voice application resources in order to provide more efficient retrieval of resources in a web-programming model such as in the VoiceXML domain. In accordance with the present invention, a voice application resource such as a document or group of documents is transformed into an internal object model, during the parsing phase and prior to execution. This model is stored in cache memory and becomes the voice application that is ultimately executed. Because the object model contains a compiled representation of the original resource and not the original resource itself, it can be executed as a binary object, thus leading to greater efficiency during execution and the reduction of cost and hardware utilization.

Figure 1:
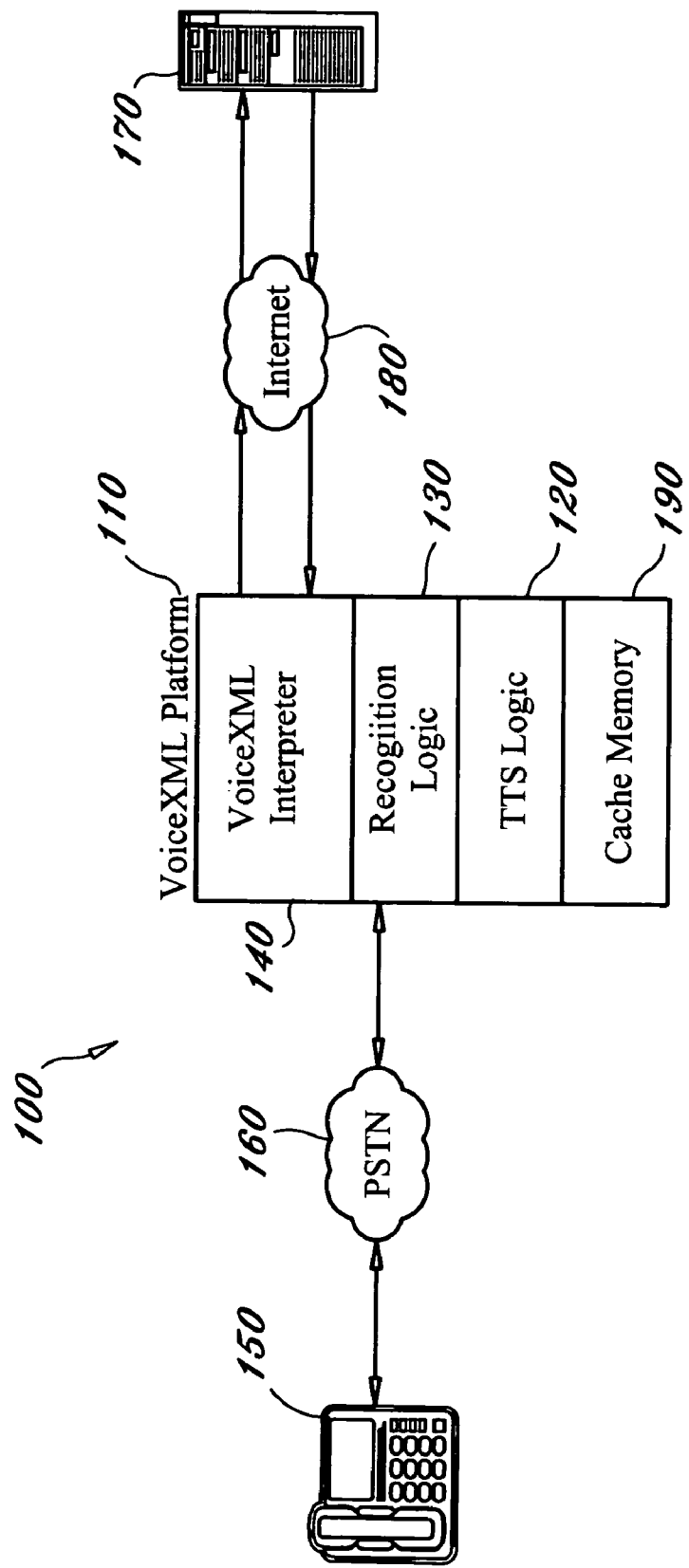
FIG. 1 is an illustration of a computer system for a speech recognition system incorporating the method and system of the present invention.

FIG. 1 shows a typical interactive voice response computer system 100 constructed in accordance with the principles of the present invention. For illustrative purposes, a VoiceXML system is shown although the invention is not limited to VoiceXML systems and is equally adaptable to any interactive voice recognition system. The system 100 is preferably comprised of a VoiceXML platform 110. Platform 110 is a VoiceXML telephony server that runs a VoiceXML interpreter 140 and acts as a client to a web content server 170. Interpreter 140 understands VoiceXML dialogues and controls speech and telephony resources. Included in platform 110 are text-to-speech (TTS) 120 and voice recognition 130 logic, one or more memory devices 190, and associated processing circuitry that controls platform 110 and the document storage and retrieval process of system 100.

The system 100 in FIG. 1 is accessed by a call from a user using an analog or digital telephone 150 over a Public Switched Telephone Network (PSTN) 160. The telephony infrastructure of system 100 receives the call and the VoiceXML platform 110 executes the appropriate application dialog. A prompt is played to the user using either pre-recorded audio prompts or TTS-generated audio files. The user input is recognized as a spoken word or a keypad touchtone. For the speech recognition scenario, the system matches the input against a pre-stored set of grammars and returns the matched text string.

The VoiceXML platform 110 sends a request for a voice application resource such as data and content to the Web Content Server 170 via a communications network, such as the Internet 180. In response, web content server 170 creates a VoiceXML document and sends it to VoiceXML platform 110. The VoiceXML platform 110 then executes the logic defined in the VoiceXML document and a response (either pre-recorded audio of a TTS-generated audio output) is played to the user.

Typical VoiceXML applications place the original VoiceXML document directly in cache after it has been retrieved from the remote server. When the document is needed again, instead of going to the server, the document is fetched from cache and reparsed. However, the reparsing of the VoiceXML document adds to the document retrieval time and requires additional memory resources. The present invention advantageously eliminates the need to reparse the resource by transforming the VoiceXML document to an object model that requires no parsing and no additional retrieval time before it is stored in cache memory.

Figure 2:
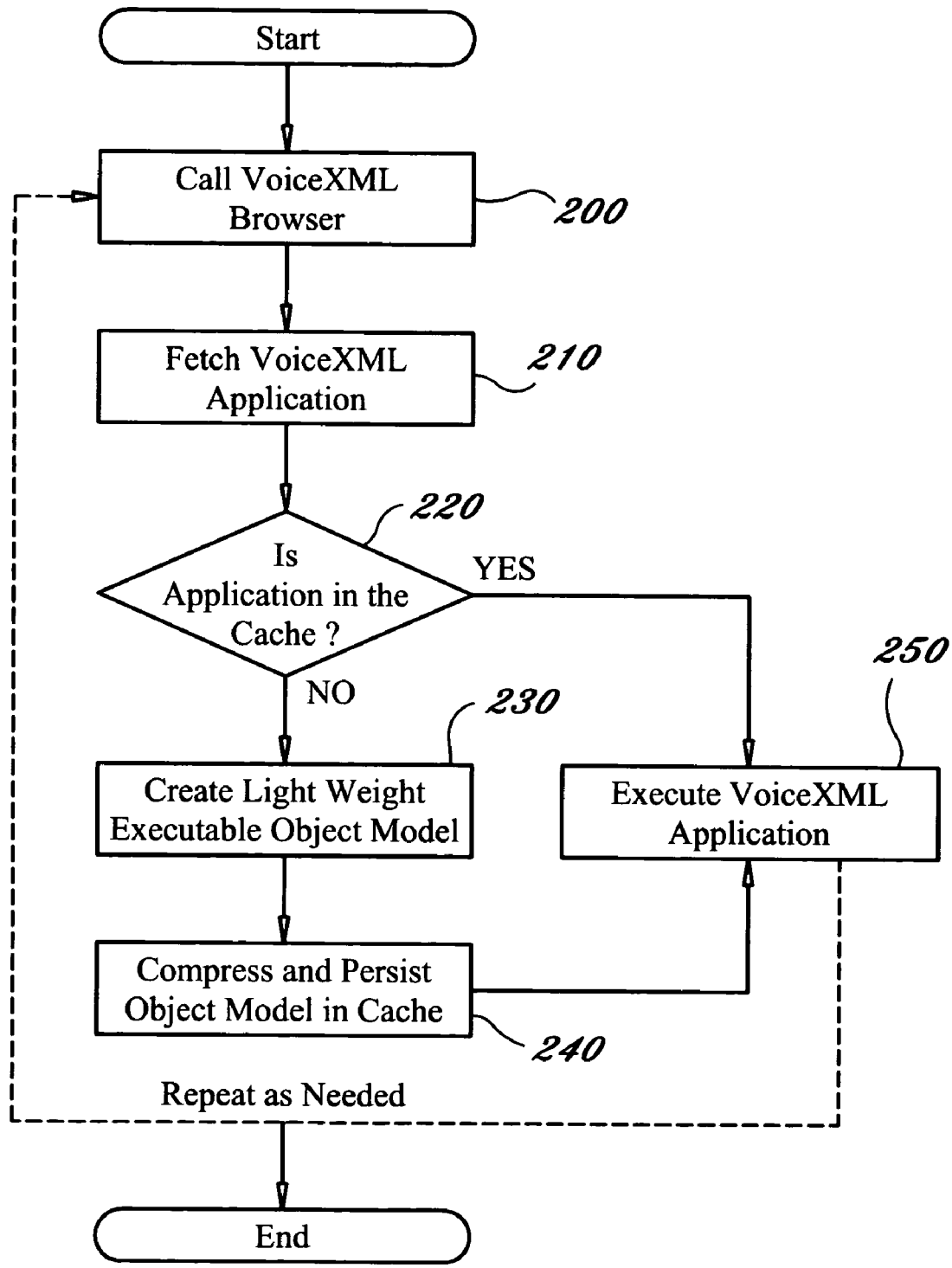
FIG. 2 is a flowchart illustrating the process of compiling and caching voice application documents in an interactive voice recognition system utilizing the method and system of the present invention.

Referring to FIG. 2, a flowchart is shown illustrating the steps taken by the present invention during the compiling of a voice application resource that has been retrieved from an outside source, for example, a web server. Again, a VoiceXML system is used for illustrative purposes. A VoiceXML browser is invoked (step 200) in order to access the requested resource and the application is fetched from the web content server (step 210) over a communications network such as the Internet 180. A VoiceXML document is typically fetched from a web application server and in order to avoid having to use the web to access this document again, the document is usually stored in the system cache memory. However, prior to placing the document in cache, the present invention performs a series of steps in order to avoid the need to reparse and recompile the cached document upon a subsequent document request.

The cache memory 190 is queried to determine if the resource document is already in cache (step 220). If the document is not in the system cache, i.e. it is retrieved from the web server 170, and an object representation of the VoiceXML document is created (step 230). The object representation stage (step 230) includes code generation phase and code optimization phases, which are commonly known in the art of compiler construction. The object representation of the resource document is comprised of data, which represents those portions of the VoiceXML application that are to be executed. The system generates and optimizes code that represents what needs to be done to support the application and allow the object model to be executed. The result is an optimized version of the resource document. This optimized or "lightweight" executable object is a representation of the resource document, containing all the data of the source document, yet occupies a smaller footprint when stored in memory. Once the object model is created, it is compressed and stored in cache memory (step 240) where it can be executed (step 250) without being reparsed or recompiled.

In typical Interactive Voice Response (IVR) systems, the source document is compiled and checked for proper syntax and semantics before being stored in cache memory. However, because the compiled document that is to be stored in cache is merely a duplication of the original VoiceXML document, it must be reparsed each time it is accessed. Therefore, although there is no longer a need to fetch the requested document from the web server, the need to recompile the resource adds time to the document retrieval process and demands additional hardware resources. In order to reduce parsing time, the present invention advantageously optimizes the fetched document by utilizing a series of steps to create the "Lightweight" Executable Object Model, which is a compressed and executable representation of the original document. The "Lightweight" Executable Object Model is comprised of data representing the VoiceXML document, and code that is necessary to execute the data.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of caching documents in a voice recognition system, the method comprising:
   receiving a requested voice application resource from a server;
   compiling the requested voice application resource into a representative lightweight executable object model that may be executed without being reparsed;
   storing the representative object model with the compiled voice application resource in cache memory for execution; and,
   executing the compiled voice application resource in the representative object model from cache memory without first reparsing and recompiling the voice application resource.

2. The method of claim 1, further comprising compressing the representative object model before storing it in memory for execution.

3. The method of claim 1, wherein the voice application resource is a VoiceXML document.

4. A computer program product comprising a computer readable usable storage medium embodying computer usable program code for caching documents in a voice recognition system, the computer program product comprising:
   computer usable program code for receiving a requested voice application resource from a server;
   computer usable program code for compiling the requested voice application resource into a representative lightweight executable object model that may be executed without being reparsed;
   computer usable program code for storing the representative object model with the compiled voice application resource in cache memory for execution; and,
   computer usable program code for executing the compiled voice application resource in the representative object model from cache memory without first reparsing and recompiling the voice application resource.

5. The computer program product of claim 4, further comprising computer usable program code for compressing the representative object model before storing it in memory for execution.

6. The computer program product of claim 4, wherein the voice application resource is a VoiceXML document.

7. A voice recognition data processing system for caching documents, the data processing system comprising:
   a computer with at least one processor, memory and a computer readable storage medium; and,
   computer usable program code disposed in the computer readable storage medium, the computer usable program code being enabled upon execution in the memory by at least one processor of the computer to receive a requested voice application resource from a server, to compile the requested voice application resource into a representative lightweight executable object model that may be executed without being reparsed, to store the representative object model with the compiled voice application resource in cache memory of the computer for execution by at least one processor of the computer, and to execute by at least one processor of the computer the compiled voice application resource in the representative object model from cache memory without first reparsing and recompiling the voice application resource.

8. The data processing system of claim 7, wherein the computer usable program code is further enabled to compress the representative object model before storing it in memory for execution.

9. The data processing system of claim 7, wherein the voice application resource is a VoiceXML document.

* * * * *